(12) United States Patent
Anderson (10) Patent No.: US 6,538,698 B1
(45) Date of Patent: Mar. 25, 2003

(54) METHOD AND SYSTEM FOR SORTING IMAGES IN AN IMAGE CAPTURE UNIT TO EASE BROWSING ACCESS

(75) Inventor: Eric C. Anderson, San Jose, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/143,492

(22) Filed: Aug. 28, 1998

(51) Int. Cl.⁷ .................. H04N 5/222; H04N 5/76; G09G 5/00
(52) U.S. Cl. ............... 348/333.05; 348/333.02; 348/231.2; 345/778; 345/786; 345/830
(58) Field of Search ............... 348/333.01, 333.02, 348/333.05, 333.11, 333.12, 14.07, 169, 231.2, 231.5, 231.6, 252; 358/909.1; 345/778, 786, 830, 831

(56) References Cited

U.S. PATENT DOCUMENTS

| | | | |
|---|---|---|---|
| 5,633,678 A | * 5/1997 | Parulski et al. | 348/231.5 |
| 5,706,457 A | * 1/1998 | Dwyer et al. | 345/835 |
| 5,781,650 A | * 7/1998 | Lobo et al. | 382/118 |
| 5,796,428 A | * 8/1998 | Matsumoto et al. | 358/909.1 |
| 5,917,488 A | * 6/1999 | Anderson et al. | 345/838 |
| 6,122,003 A | * 9/2000 | Anderson | 348/333.01 |
| 6,226,449 B1 | * 5/2001 | Inoue et al. | 348/231.4 |
| 6,233,015 B1 | * 5/2001 | Miller et al. | 348/333.05 |
| 6,249,316 B1 | * 6/2001 | Anderson | 348/333.05 |
| 6,310,648 B1 | * 10/2001 | Miller et al. | 348/333.05 |
| 2001/0012062 A1 | * 8/2001 | Anderson | 348/231 |

FOREIGN PATENT DOCUMENTS

JP          10162020 A    * 6/1998    ........... G06F/17/30

* cited by examiner

Primary Examiner—Wendy R. Garber
Assistant Examiner—John Villecco
(74) Attorney, Agent, or Firm—Sawyer Law Group LLP (57) ABSTRACT

Method and system aspects for locating a desired image from a plurality of images stored in an image capture unit are described. In an exemplary method aspect, the method includes sorting the plurality of images in the image capture unit according to a sort criteria. The method further includes displaying the sorted images as one or more image groups on a display interface of the image capture unit. Additionally included is providing browsing access of the displayed, sorted images by group, wherein locating of a desired image occurs.

12 Claims, 13 Drawing Sheets

METHOD AND SYSTEM FOR SORTING IMAGES IN AN IMAGE CAPTURE UNIT TO EASE BROWSING ACCESS

FIELD OF THE INVENTION

The present invention relates generally to an image capture unit and more particularly to a method and system for sorting and browsing captured images in an image capture unit.

BACKGROUND OF THE INVENTION

In general, modern digital cameras for taking pictures of scenes and the like typically include an imaging device which is controlled by a computer running a single threaded process. When an image is captured, the imaging device is exposed to light and generates raw image data representing the image. The raw image data is typically stored in a single image buffer where it is then processed and compressed by the processor. Many types of compression schemes are used to compress the image data, with the joint photographic expert group (JPEG,) standard being the most popular. After the processor processes and compresses the raw image data into JPEG image files, the processor stores the JPEG image files into an internal memory or on an external memory card.

Some digital cameras are also equipped with a liquid-crystal display (LCD) or other type of display screen on the back of the camera. Through the use of the LCD, the processor can cause the digital camera to operate in one of two modes, record and play, although some cameras only have a record mode. In record mode, the LCD is used as a viewfinder in which the user may view an object or scene before taking a picture. In play mode, the LCD is used a playback screen for allowing the user to review previously captured images either individually or in arrays of four, nine, or sixteen images.

In reviewing images, most cameras merely store images in an order corresponding to the order with which the images are captured. Thus, most recently taken images are usually the ones displayed. To locate a previously taken image, a user is required to move from image to image until the desired image is found. Since the storage capacity of most cameras is limited and thus allows only a limited number of images among which to search, moving through images to find a particular image is straightforward and simple. But, as the storage capacity increases, greater and greater numbers of images may be held within the camera, e.g., from several hundred to a thousand or more. Finding a particular image among the large number of stored images thus becomes more difficult and time-consuming.

Parulski, et al., U.S. Pat. No. 5,633,678, describes a camera that allows manual selection of a category for a group of pictures prior to capture of the images. To utilize the images by category, a user is required to connect to a host computer, with the host computer downloading the images into file folders based on the categories. The required use of an external, host computer severely restricts a user's ability to find a particular image stored within the camera itself based on the categories. Further, the mere utilization of user-specified categories limits flexibility in the types of categories and associations available for locating images. Parulski, et al. further fails to allow groups of sorted images to be represented in a single image format.

Accordingly, a need exists for a convenient and efficient manner of browsing images to ease access to stored images in an image capture unit. The present invention addresses such a need.

SUMMARY OF THE INVENTION

The present invention provides aspects for locating a desired image from a plurality of images stored in an image capture unit. In an exemplary method aspect, the method includes sorting the plurality of images in the image capture unit according to a sort criteria. The method further includes displaying the sorted images as one or more image groups on a display interface of the image capture unit. Additionally included is providing browsing access of the displayed, sorted images by group, wherein locating of a desired image occurs.

Through the present invention, finding a particular image or image type is more readily achieved in an image capture unit. The present invention provides sorting capabilities within the image capture unit that allow browsing of images by category groups. The organized images reduce the burden of searching and provide a more easily examined image set. These and other advantages of the aspects of the present invention will be more fully understood in conjunction with the following detailed description and accompanying drawings.

DETAILED DESCRIPTION OF THE INVENTION

The present invention relates to a method and system for sorting digital images stored in an image capture unit for easing browsing access of the stored images. The following description is presented to enable one of ordinary skill in the art to make and use the invention and is provided in the context of a patent application and its requirements. Although the present invention will be described in the context of a still digital camera, various modifications to the preferred embodiment will be readily apparent to those skilled in the art and the generic principles herein may be applied to other embodiments. That is, any digital imaging capture device which captures, stores, or displays digital images, could incorporate the features described hereinbelow and that device would be within the spirit and scope of the present invention. Thus, the present invention is not intended to be limited to the embodiment shown but is to be accorded the widest scope consistent with the principles and features described herein.

Figure 1:
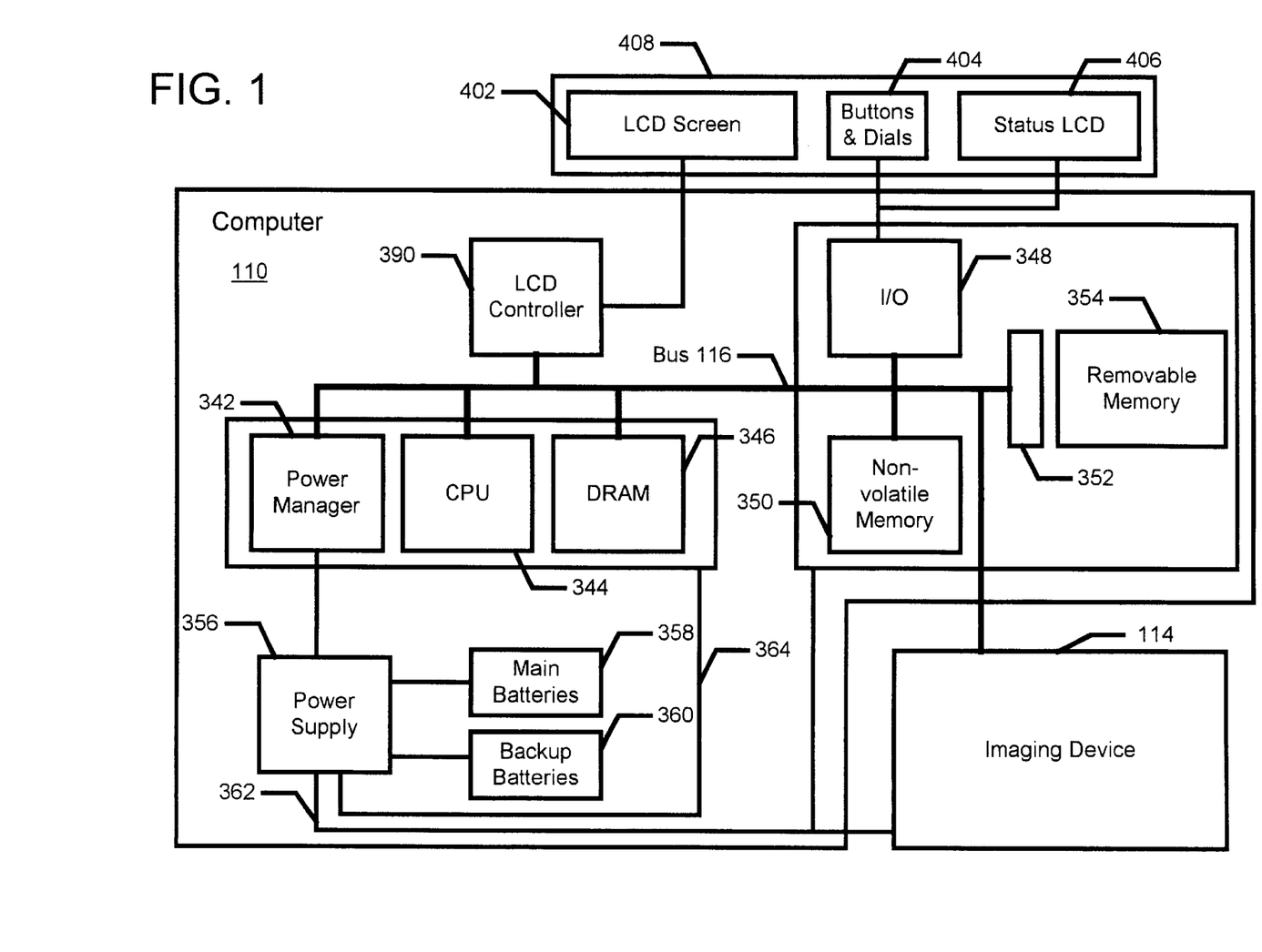
FIG. 1 illustrates a block diagram of one preferred embodiment of a digital camera is shown for use in accordance with the present invention.

Referring now to FIG. 1, a block diagram of one preferred embodiment of a digital camera 110 is shown for use in accordance with the present invention. Camera 110 preferably comprises an imaging device 114, a system bus 116 and a computer 118. Imaging device 114 includes an image sensor, such as a charged coupled device (CCD) or a CMOS sensor, for generating a set of raw image data representing a captured image. In a preferred embodiment, system bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352 that connect an optional removable memory 354 to system bus 116.

CPU 344 may include a conventional microprocessor device for controlling the operation of camera 110. In the preferred embodiment, CPU 344 is capable of concurrently running multiple software routines to control the various processes of camera 110 within a multithreaded environment. For example, images may be captured at the same time that previously captured images are processed in the background to effectively increase the capture rate of the camera. In a preferred embodiment, CPU 344 runs an operating system that includes a menu-driven GUI and provides image processing through software, rather than hardware. An example of such software is the Digita™ Operating Environment by FlashPoint Technology of San Jose, Calif. Although CPU 344 is preferably a microprocessor, one or more DSPs (digital signal processor) or ASICs (Application Specific Integrated Circuit) could also be used. I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, such a flash disk, readily removable and replaceable by a camera 110 user via buffers/connector 352.

Power supply 356 supplies operating power to the various components of camera 110. Power manager 342 communicates via line 366 with power supply 356 and coordinates power management operations for camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Dynamic Random-Access-Memory (DRAM) 346 is a contiguous block of dynamic memory that may be selectively allocated for various storage functions. DRAM 346 stores both raw and compressed image data and is also used by CPU 344 while executing the software routines used within computer 118. The raw image data received from imaging device 114 is temporarily stored in several input buffers (not shown) within DRAM 346. Once the raw image data is processed, it is stored in a frame buffer (not shown) for display on the LCD screen 402. In a preferred embodiment, the input buffers and the frame buffer are split into two ping-pong buffers to improve the display speed of the digital camera and to prevent the tearing of the image in the display 402. After processed image data has been stored in DRAM 346, LCD controller 390 transfers the image data to LCD screen 402 for display.

Figure 2A:
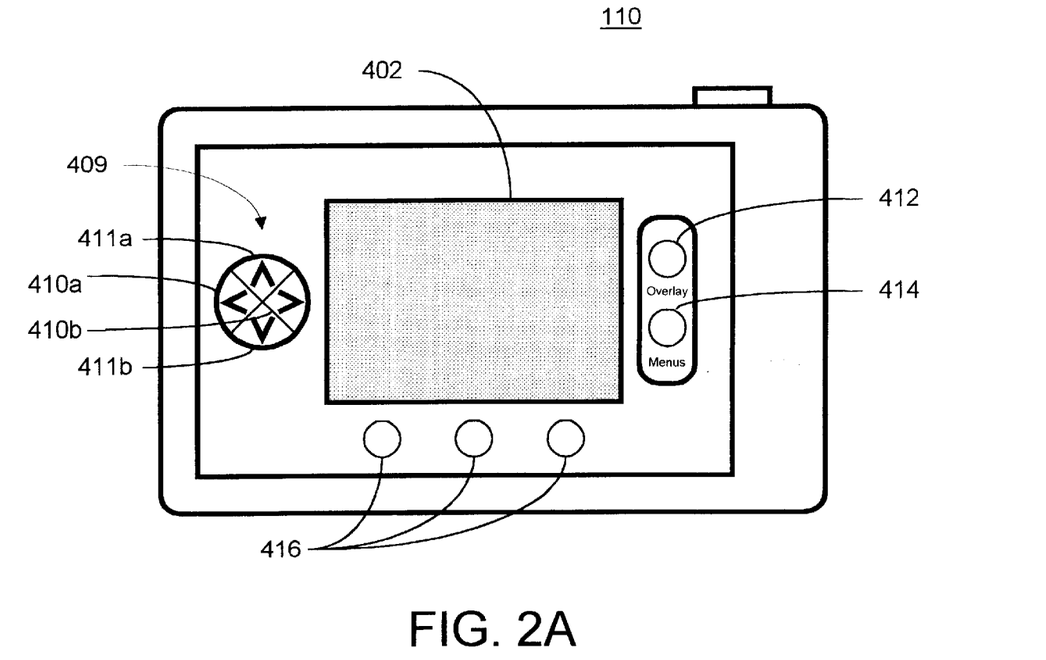
FIGS. 2A and 2B are diagrams depicting exemplary hardware components of the camera's user interface.
Figure 2B:
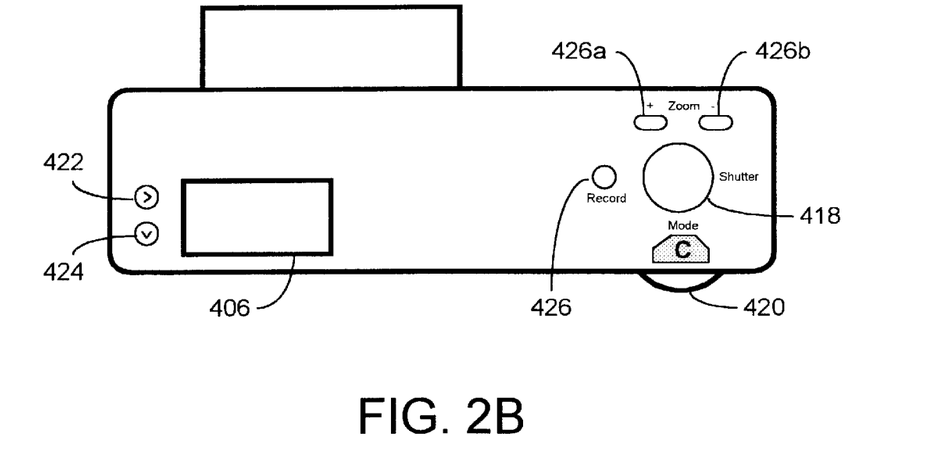

FIGS. 2A and 2B are diagrams depicting exemplary hardware components of the camera's user interface 408. FIG. 2A is back view of the camera 110 showing the LCD screen 402, a four-way navigation control button 409, an overlay button 412, a menu button 414, and a set of programmable soft keys 416. FIG. 2B is a top view of the camera 110 showing a shutter button 418, and a mode dial 420. The camera may optionally include status LCD 406, status LCD scroll and select buttons 422 and 424, a sound record button 426, and zoom-in, zoom-out buttons 426a and 426b.

The camera operates in at least two modes, capture mode for capturing images, and play mode for playing back the captured images on the LCD screen 402. Further preferably included is a review mode.

Figure 3:
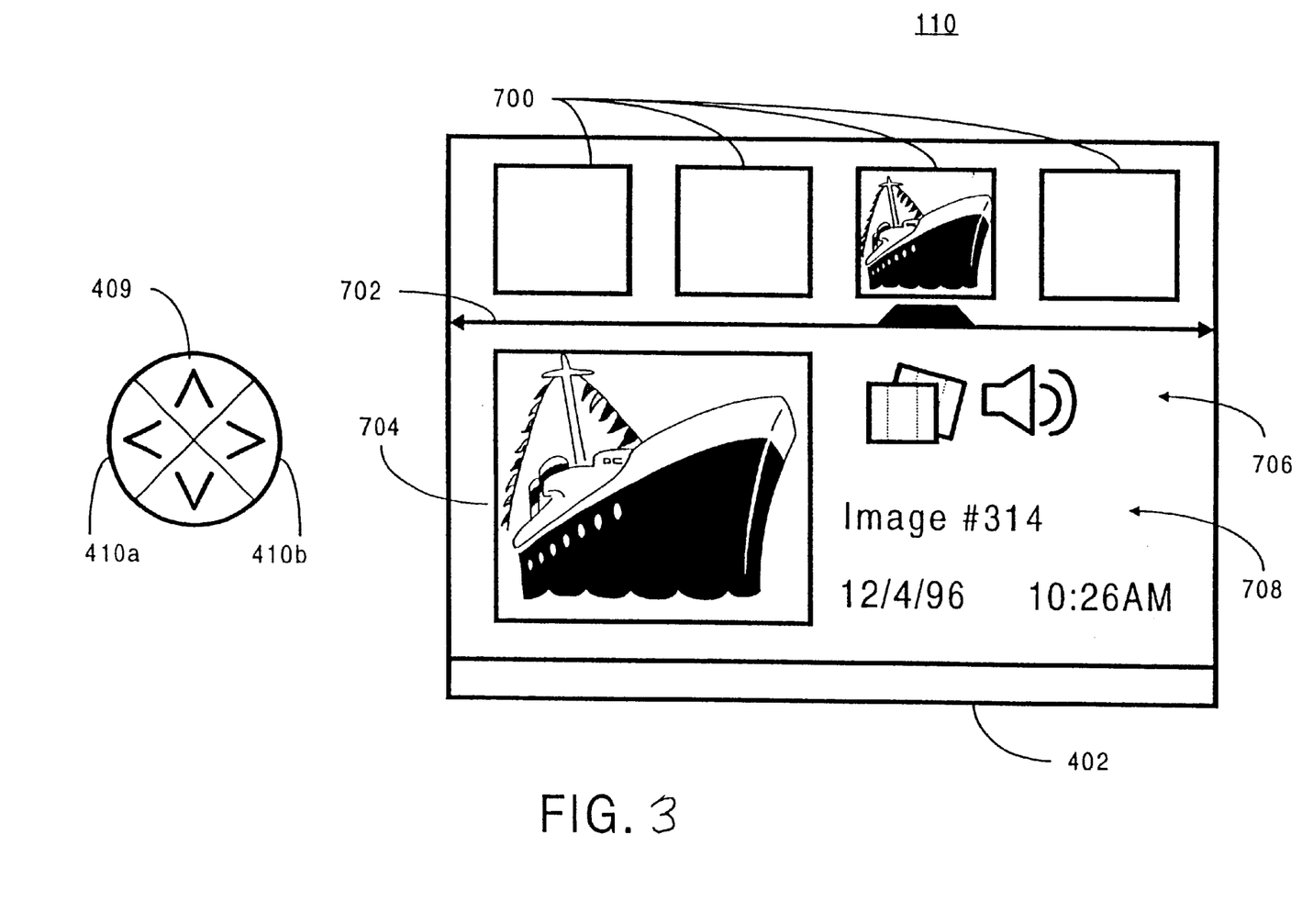
FIG. 3 is a diagram illustrating the operation and appearance of the user interface when the camera is placed into review mode.

Referring now to FIG. 3, a diagram illustrating the operation and appearance of the user interface when the camera is placed into review mode is shown. The review mode enables the user to view all the images in the camera along with specific attributes associated with each of the images.

The review screen layout is based on a filmstrip metaphor which allows users to quickly move forward and backward among pictures chronologically. In a preferred embodiment, several small-sized versions of the captured images, called thumbnails 700, are displayed in a row across the LCD screen 402. The user may scroll through the series of displayed thumbnails 700 in the LCD screen 402 using the four-way navigation control button 409. The direction of scrolling is capably mapped to the horizontal left/right buttons 410a and 410b. When the user presses the left/right buttons 410, the thumbnails 700 are scrolled-off the LCD screen 402 and replaced by new thumbnails 700 representing other captured images.

A stationary selection arrow line 702 is used as both a navigational aid and to indicate which thumbnail is the currently selected image. When there are more than four images in the camera, the selection arrow line 702 displays arrow heads to indicate movement in that direction is possible with the left/right navigation buttons 410. As the user presses the navigation buttons 410 and the thumbnails 700 scroll across the LCD screen 402, the thumbnail 700 that is positioned over a notch in the selection arrow line 702 is considered the selected image.

When a thumbnail 700 becomes the selected image, additional information corresponding to that image is automatically displayed. In a preferred embodiment, the additional information includes a large thumbnail 704 showing a larger view of the selected thumbnail, and image information comprising an icon bar 706 and text 708. The icon bar may display several icons indicating the media types associated with the active image, such as whether the image is a still, a time lapse, or a burst image, whether sound is attached to the image, and a category for the image. The displayed text 708 may include a specification of the name or number of the image, and the date and time the image was captured. The ability to review images through thumbnail images 700 assists in finding a particular image. However, as the number of stored images increases, the scrolling of images becomes an inefficient method to locate a particular image. In accordance with the present invention, a method and system are provided for sorting images to ease browsing access for more efficient locating of an image or group of images with filtering out of those images not fitting a sort criteria, as described more fully hereinbelow. A first embodiment utilizes an image stream of single, sorted images, while an alternate embodiment utilizes a hierarchical stream of composite, sorted images.

Figure 4:
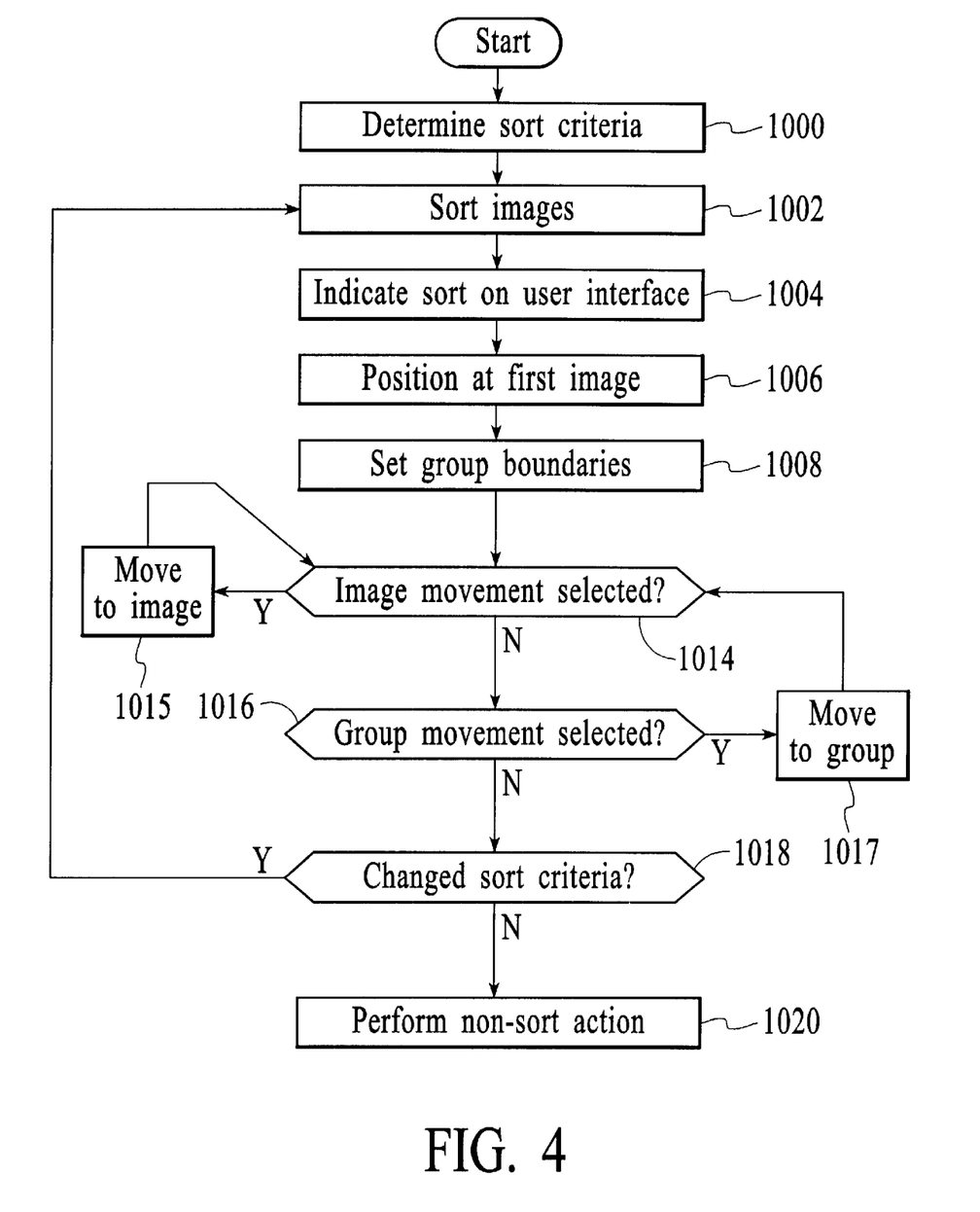
FIG. 4 illustrates a flow diagram for a process of sorting in accordance with one embodiment of the present invention.
Figure 5:
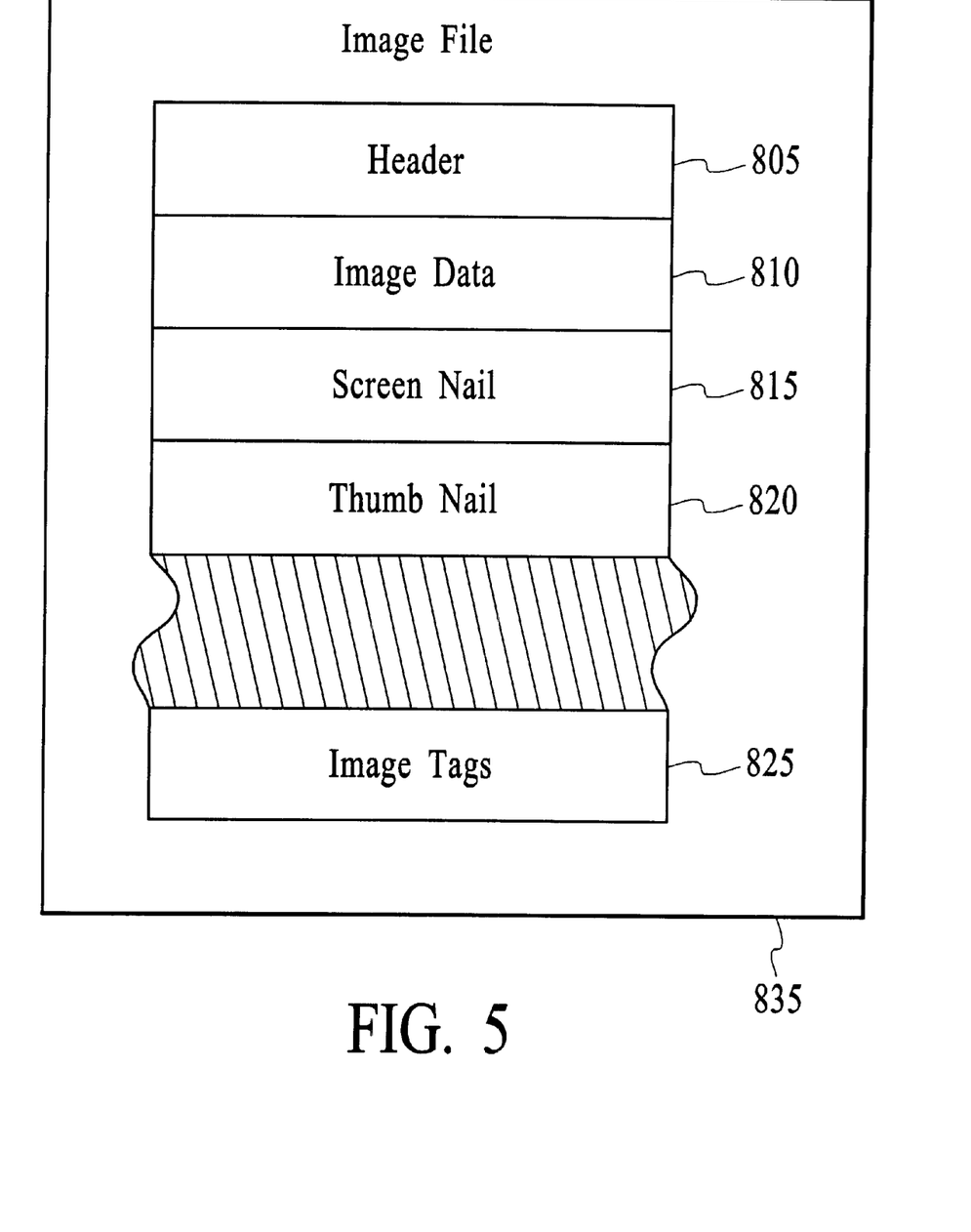
FIG. 5 illustrates a diagram of one embodiment for an image file.

In accordance with the first embodiment, as illustrated by the flow diagram of FIG. 4, a process for sorting initiates with a determination of preferred sort conditions (step 1000). In setting the sort conditions, such as through a sort menu, categories associated with individual images are suitably utilized as sort selection criteria. More particularly, image tags included in the image files associated with the images are utilized. FIG. 5 illustrates a diagram of one embodiment for an image file 835. Image file 835 includes a header 805, image data 810, a screennail 815, a thumbnail 820, and image tags 825.

Header 805 preferably includes information that identifies and describes the various contents of image file 835. Image data 810 contains actual captured image data. Image data 810 exists in whichever format that is appropriate for the current location of image file 835 within the image processing chain of the camera 110. Screennail 815 and thumbnail 820 are each different versions of image data 810 that have varying degrees of reduced resolution for a number of special viewing applications.

Figure 6:
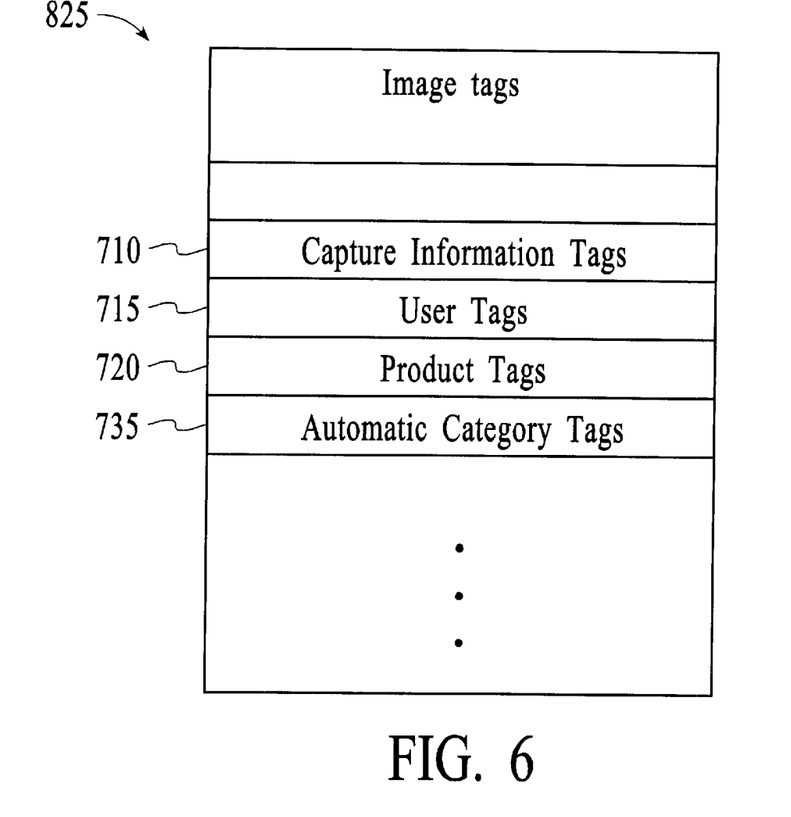
FIG. 6 illustrates a diagram of one embodiment for the image tags.

Image tags 825 include various types of information that correspond and relate to particular captured image data 810, as discussed in conjunction with FIG. 6.

Referring to FIG. 6, a diagram of one embodiment for the image tags 825 is shown. In the FIG. 6 embodiment, image tags 825 include capture information tags, user tags 715, product tags 720, and automatic category tags 735. Capture information tags 710 preferably include various types of information that correlate with the capture image data 810. For example, capture information tags 710 may indicate focus setting, aperture setting, and other relevant information that may be used for effectively processing or analyzing the corresponding image data. User tags 715 include those labels a user specifies for a given image, often referred to as 'stamps', such as 'birthday' or 'vacation', etc., that aid in personal categorization of the images. Product tags 720 typically contain various other information, such as camera 110 manufacturer.

Automatic category tags 735 result from analysis of the image data, such as described in co-pending U.S. patent application, Ser. No. (09/121,760), entitled "System and Method for Automatic Analysis and Categorization of Images in an Electronic Imaging Device", assigned to the assignee of the present invention, and filed Jul. 23, 1998. For example, individual image analysis may generate automatic category tags 735 based on detection of a person or groups of persons according to characteristics, like substantial amounts of flesh tones within the image. Category tags resulting from detection of nature scenes from characteristics, like substantial green content in the image combined with the relative lack of hard edges, are also possibly automatically generated. Similarly, categories like city images, water images, or indoor images may be detected by characteristic features contained in those images.

For sorting, in addition to specifying the categories, an order for the sort is set. For example, a default sort order may be set as from most recently taken to least recently taken or alphabetical by category name. Of course, other orders may be used as desired. Additionally, a multiple sort order may also be specified, such that there is a primary level sort order and one or more sub-level sort orders. By way of example, a primary sort order may be chosen as category name, with a sub-level sort order by date of capture within each category.

Figure 7:
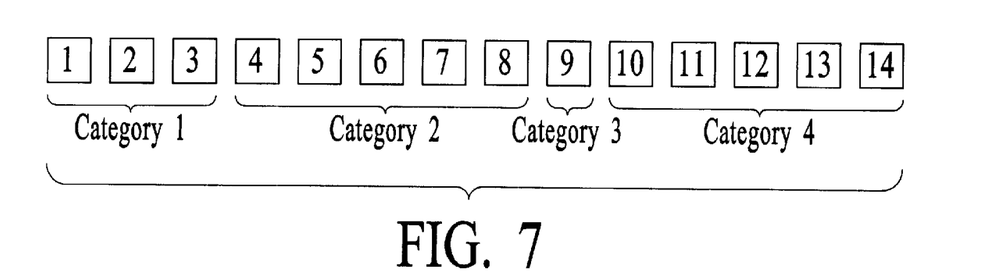
FIG. 7 represents an example of a stream of images ordered in accordance with four chosen categories.
Figure 8A:
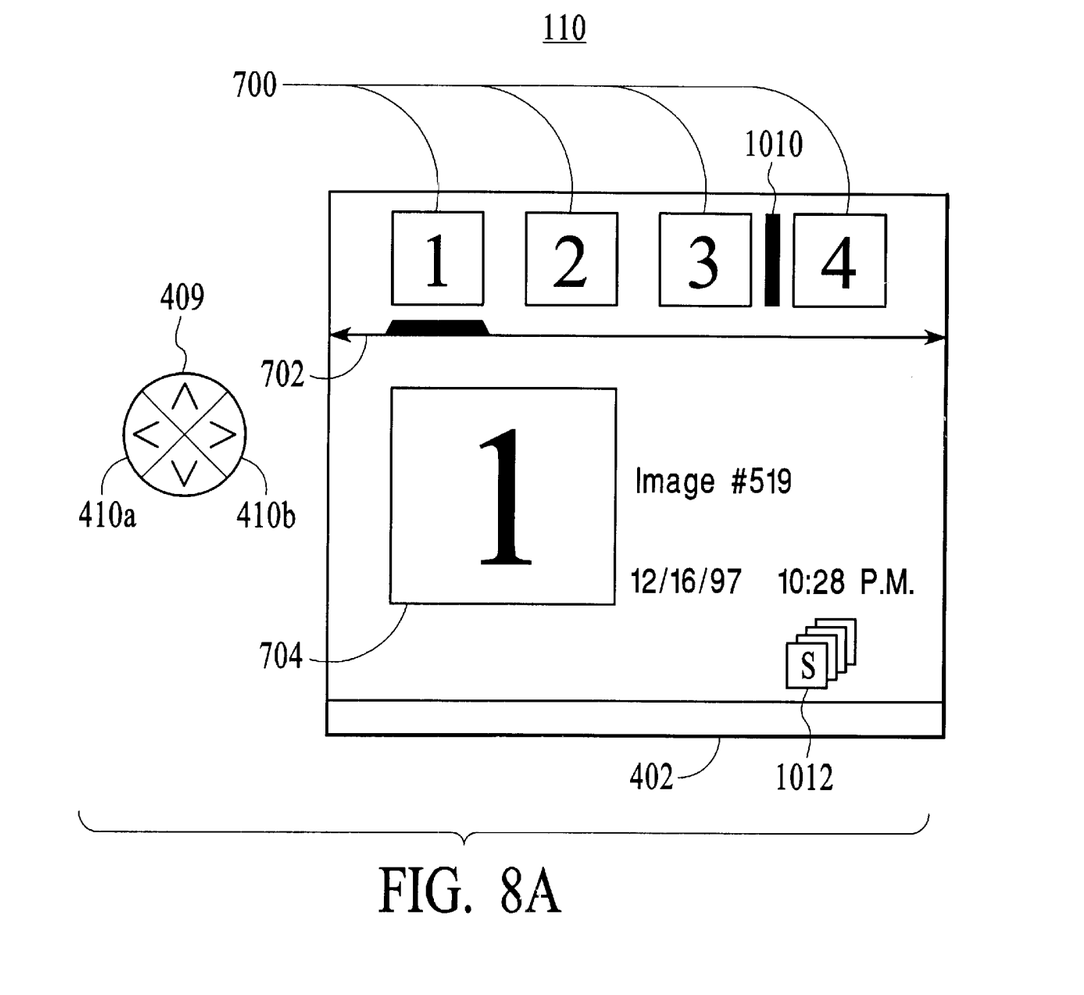
FIGS. 8A, 8B, and 8C illustrate examples of the user interface with a display of the images as single images in accordance with one embodiment of the present invention.

Once the sort criteria are specified, the images are sorted (step 1002). FIG. 7 represents an example of a stream of images ordered in accordance with four chosen categories, category one, category two, category three, and category four. For example, successive weeks may be the chosen category criteria, or specific categories, such as animal images, family images, office images, and vacation images. When an image falls into more than one sort category, such as family and vacation, multiple copies of the image may be included in the stream, one for each category the image matches. Alternatively, only one copy of the image is included in the first category group to which it belongs. With the sorting, preferably an indicator is provided in the user interface, such as an icon, that indicates that the images have been ordered by a sort action (step 1004), and the displayed images are positioned at a first image of the sorted images (step 1006). Group boundaries are also set upon sorting (step 1008). The group boundaries are capably set by the separate categories chosen, and may be indicated, if desired, visually in the user interface, such as with a vertical line, to separate the groups. FIG. 8A illustrates the user interface on LCD screen 402 with a display of the sorted images of FIG. 7 as single images with the separation among a display of single images by categories visually indicated, e.g., by a vertical bar symbol 1010, while the fact that the images are sorted is suitably represented by another visual indicator, such as an icon 1012. In an alternate embodiment, the group boundaries may be automatically generated by determining a reasonable number of images for a grouping, e.g., 15 images per group. By way of example, if the only criteria is to sort by date, a determination can be made as to whether a monthly, weekly, daily, or even yearly grouping arrangement would best group the images based on the number of images falling into those categories. Thus, if a user takes images somewhat sparingly each month, the number of stored images per month should fall within a reasonable number to arrange the sorted images as groups by month.

Figure 8B:
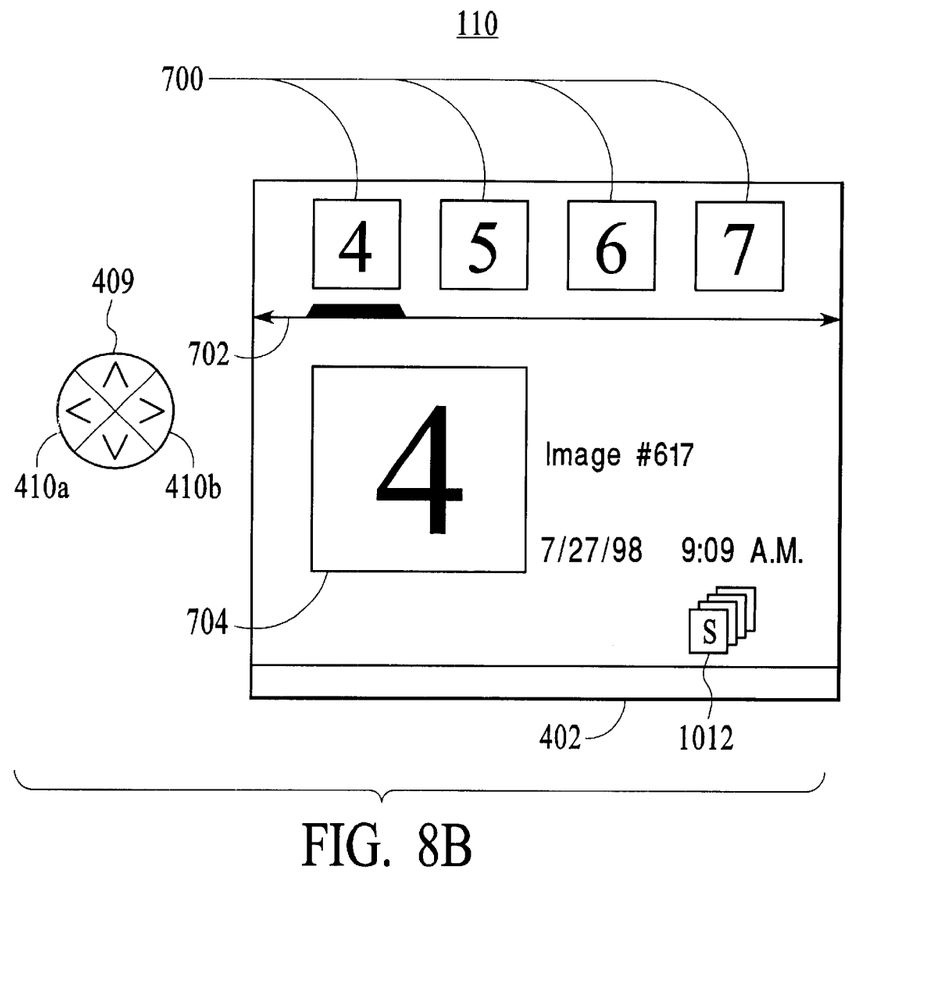
Figure 8C:
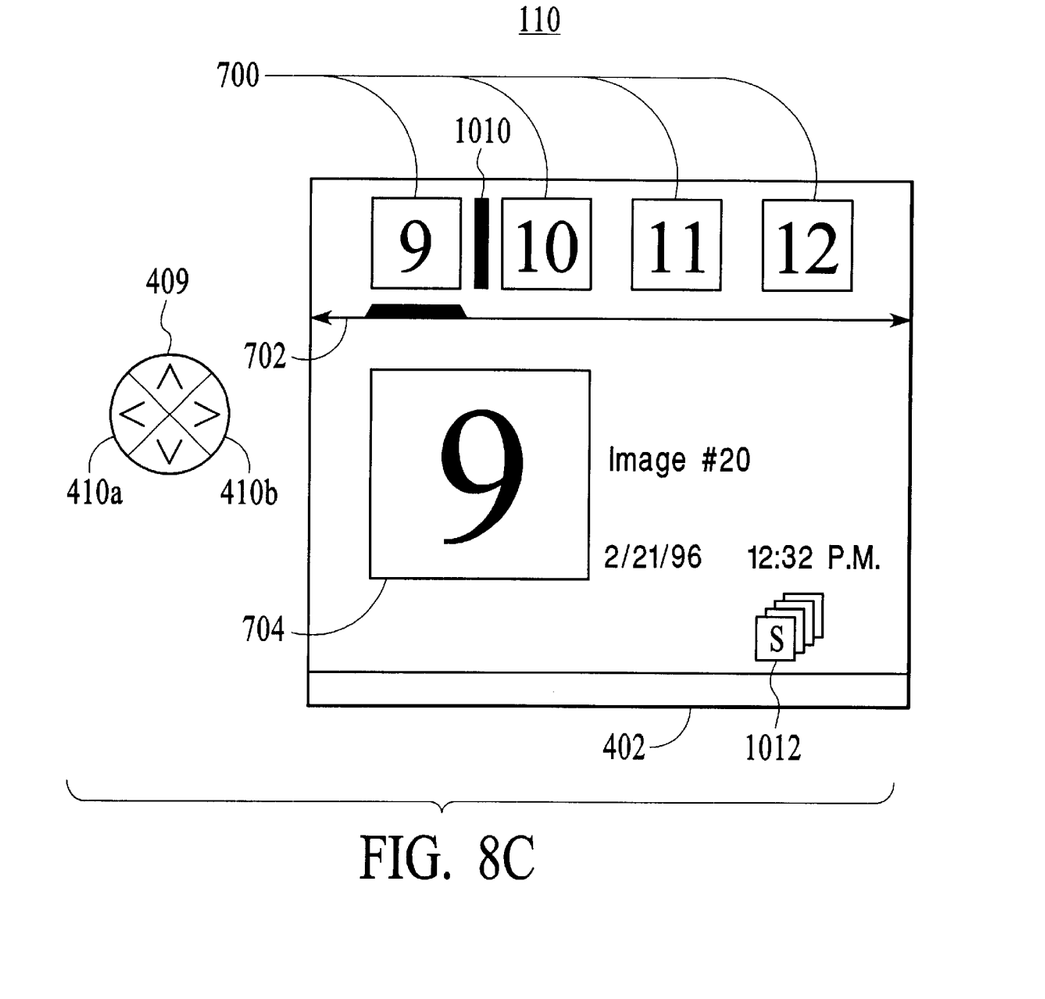

With the group boundaries set, a determination of whether a user has moved among the images is made. Thus, if a selection is to move forward or backward among single images occurs, e.g., by 'single-clicking' (a single press of)

the horizontal left/right buttons 410a and 410b (step 1014), the next or previous image is selected (step 1015). If not, the system determines if the user has moved forward or backward one group, e.g., by 'double-clicking' (two successive presses of) the horizontal left/right button 410a and 410b, (step 1016). A next or previous group is then selected (step 1017). By way of example, FIGS. 8B and 8C illustrate the manner in which the user interface on LCD 402 changes as a user moves among the sorted images by group. Thus, FIG. 8B illustrates a change corresponding to selection of the group for category two, while FIG. 8C illustrates a change corresponding to selection of the group for category three.

Referring back to FIG. 4, the process further includes determining whether the user has changed the sort criteria, via step 1018, and returning to step 1002 to sort the images when there is changed criteria. Of course, when another action occurs, that action is suitably performed (step 1020), and may cause the sort to be nullified, such as an action to take a picture, or turn the camera off.

Figure 9:
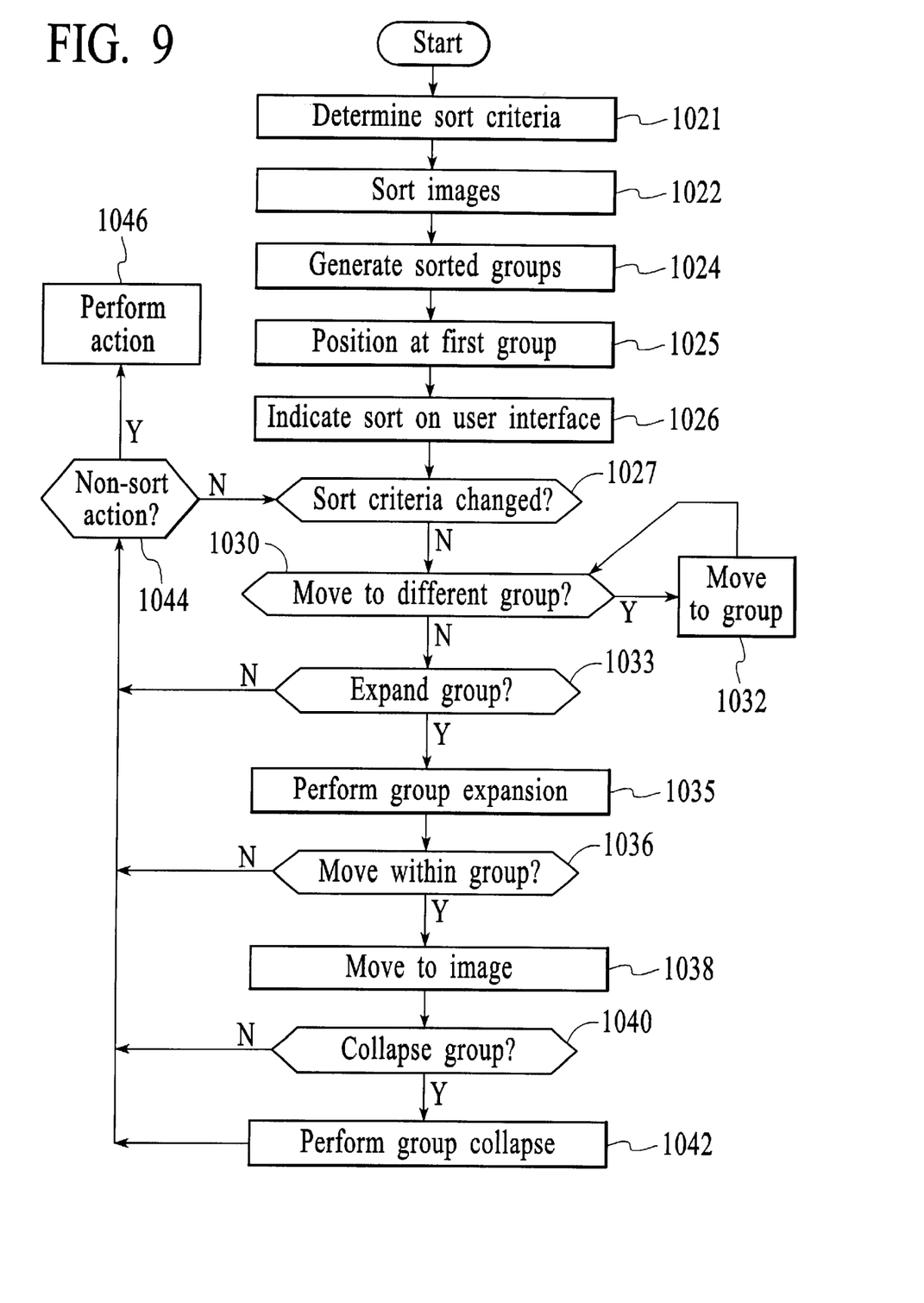
FIG. 9 illustrates a flow diagram for a process for sorting in accordance with one embodiment of the present invention utilizing a hierarchical stream of composite, sorted images.
Figure 10:
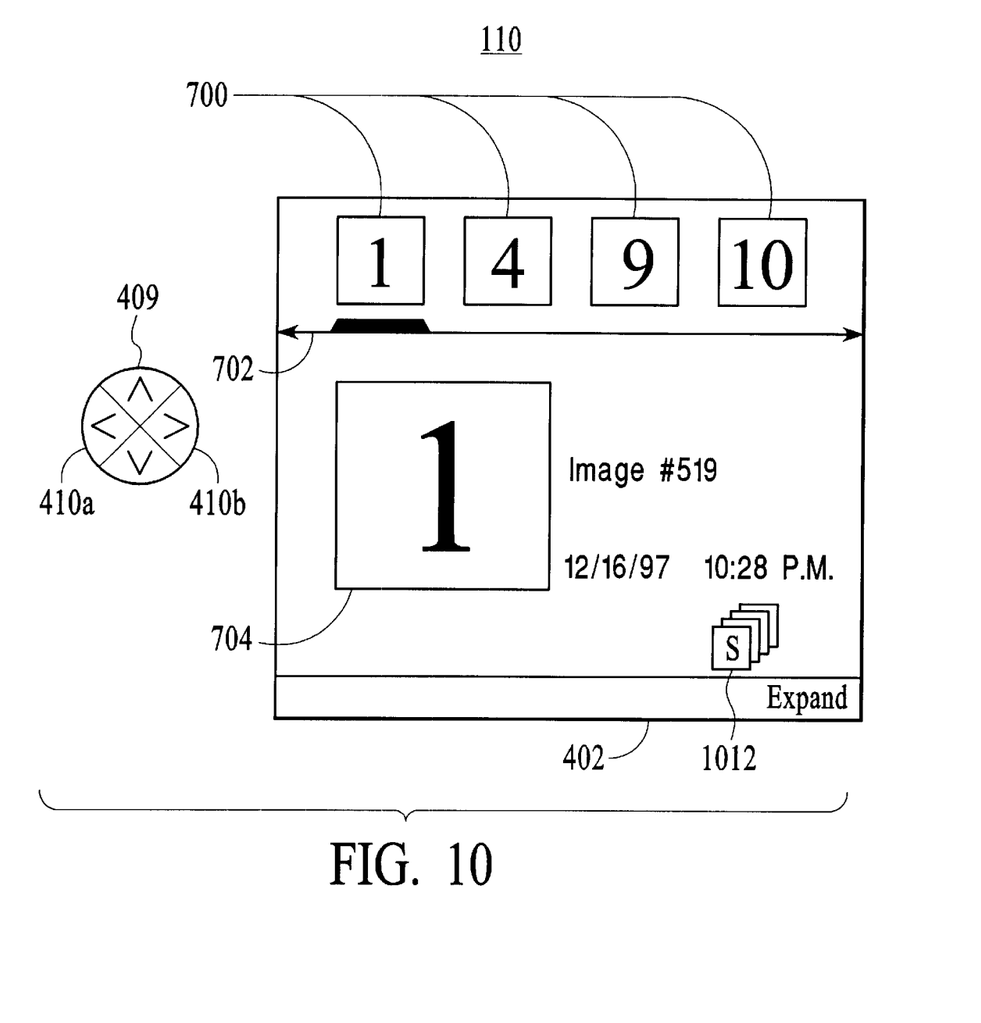
FIG. 10 illustrates an example of separate, composite images on the user interface in accordance with the embodiment of FIG. 9.
Figure 11A:
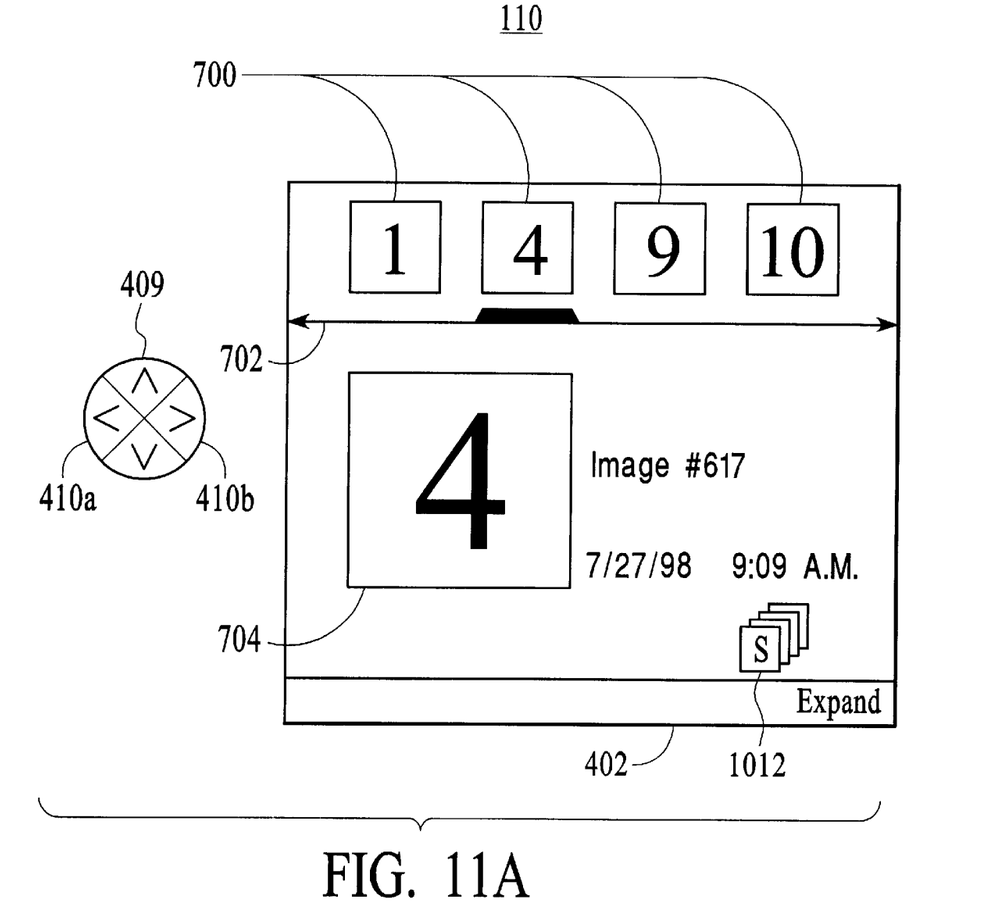
FIGS. 11A and 11B illustrate examples of user interface depictions following movement among the sorted groups of FIG. 10.

Referring now to FIG. 9, for the alternate embodiment utilizing a hierarchical stream of composite, sorted images, determining of sort criteria and performing the sort, steps 1022 and 1024, occur as described above with reference to steps 1000 and 1002 FIG. 4. In addition, sorted groups are generated and displayed as separate, composite images on the user interface (step 1024), with positioning at a first group (step 1025), as illustrated by the example in FIG. 10. Suitably, a first image in each category group is displayed as a single image, thus the first image, image 1, from category one, the first image, image 4, from category two, the first image, image 9, from category three, and the first image, image 10, from category four are displayed. Since each 'image' as a composite image represents a group of images, the user interface preferably includes an 'Expand' indicator on LCD screen 402 so that a user is aware of the compound nature of the displayed image. The sort indicator 1012 is also provided (step 1026). Unless the sort criteria is changed, as determined via step 1027, the process determines if a user moves among the groups (step 1030). The position then shifts in accordance with the movement (step 1032). To move between groups, a single selection of the horizontal left/right button 410a and 410b is suitable, since each unexpanded composite image represents a separate group. For example, result of a move from category one to category two is shown by FIG. 11A.

Figure 11B:
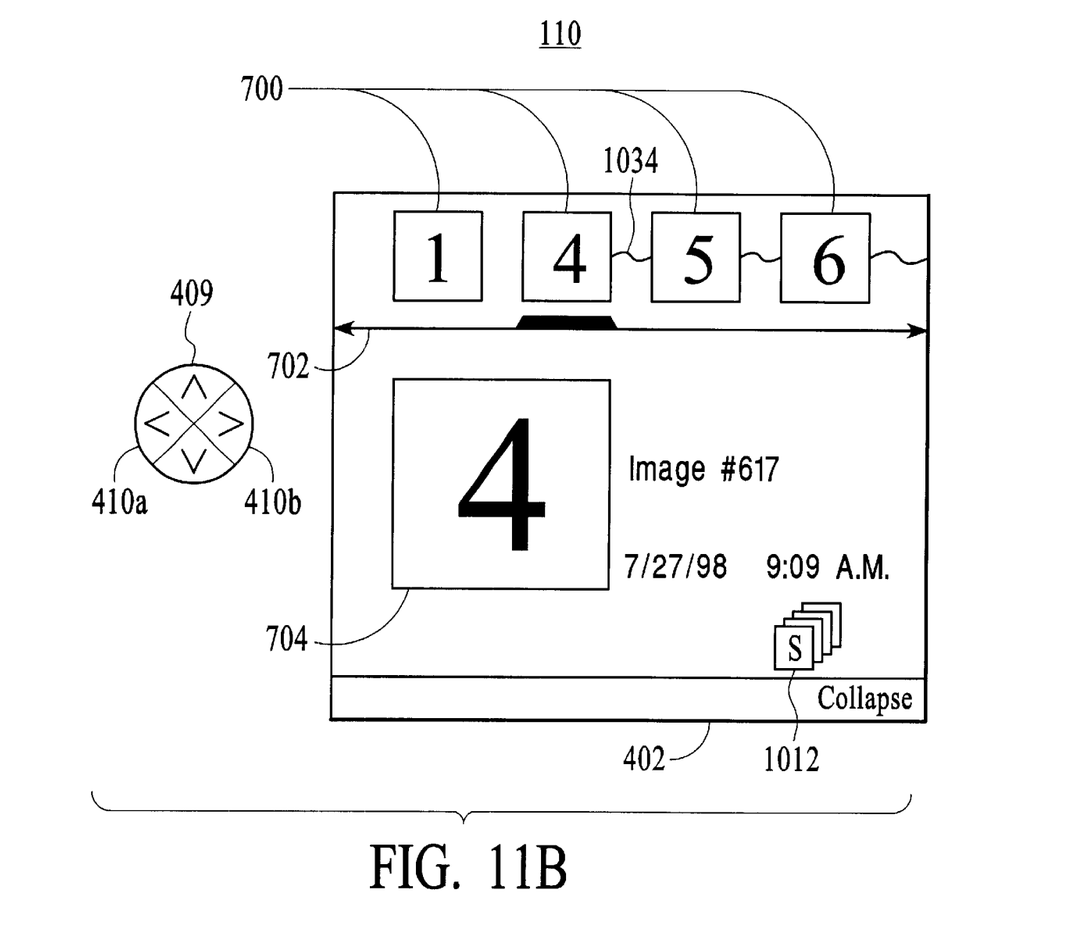

When at a desired group, a determination of whether an expansion of the group is performed (step 1033), e.g. by selecting a soft key 416 (FIG. 2A) corresponding to the 'Expand' indicator. When the expand control is selected, all the images in the group may be seen, as shown by the illustration of the user interface in FIG. 11B. The connectedness of the images is suitably visually indicated, such as by a link indicator 1034. Of course, a group separation indicator, such as the aforementioned vertical bar symbol, may also be visually indicated, if desired. If expanded (step 1035), a determination of whether a movement is performed among the images of the group is made (step 1036). If so, the position shifts forward or backward in accordance with the direction of the movement (step 1038). Collapsing the group may then occur, such as by selecting a soft key 416 (FIG. 2A) corresponding to a 'Collapse' indicator, as determined via step 1040 and performed via step 1042. Note, the soft-key indicators change in accordance with the selection, e.g., to 'Collapse' once 'Expand' is selected and vice versa. For a single image, suitably the soft-key indicator is blank, since no expand/collapse action can occur. The process continues from step 1044 to determine if a non-sorting action occurs, such as previously described with reference to step 1020 FIG. 4, which is then performed appropriately (step 1046).

In summary, a method and system for sorting images to ease browse access have been disclosed. Although the present invention has been described in accordance with the embodiments shown, one of ordinary skill in the art will readily recognize that there could be variations to the embodiments and those variations would be within the spirit and scope of the present invention. In addition, software written according to the present invention may be stored on a computer-readable medium, such as a removable memory, or transmitted over a network, and loaded into the digital camera for execution. Accordingly, many modifications may be made by one of ordinary skill in the art without departing from the spirit and scope of the appended claims.

What is claimed is:

1. A method for locating a desired image from a plurality of images stored in an image capture unit, the method comprising:
   sorting the plurality of images in the image capture unit according to a sort criteria;
   displaying the sorted images as one or more image groups on a display interface of the image capture unit as a stream of single, sorted images with a separation indicator between images of different groups of the one or more image groups;
   providing browsing access of the displayed, sorted images by group, wherein locating of a desired image occurs by supporting movement from one image to a next image in response to a single selection of a movement control and from one group to a next group in response to a double select,ion of the movement control.

2. The method of claim 1 wherein displaying the sorted images as one or more image groups further comprises displaying the sorted images as composite images.

3. The method of claim 2 wherein providing browsing access further comprises supporting movement from one group to a next group by moving from one composite image to a next composite image.

4. The method of claim 3 further comprising providing expansion of a composite image to display a linked set of sorted images for the group represented by the composite image.

5. The method of claim 1 wherein the sort criteria further comprises category designations.

6. The method of claim 5 wherein the category designations further comprise automatic category tags.

7. The method of claim 6 wherein the category designations further comprise capture tags.

8. The method of claim 7 wherein the category designations further comprise user tags.

9. The method of claim.7 wherein sorting further arranges the images in a chosen order according to the category designations.

10. A system for sorting images to ease browsing access to the images in an image capture unit, the system comprising:
   a memory means for storing image data including associated image tags for a plurality of captured images, the associated image tags comprising automatic category tags, capture tags, and user tags;

processing means coupled to the memory means for sorting the image data into category groups according to a chosen sort criteria based on the associated image tags;

a selector means coupled to the processing means for selecting forward/backward movement among the category groups, wherein a single selection of the selector means selects a different image, and a double selection of the selector means selects a different group; and display means coupled to the processing means and memory means for displaying the sorted image data, wherein browsing of the sorted image data by category groups is achieved.

11. The system of claim 10 wherein the display means displays the category groups as separate composite images.

12. The system of claim 10 wherein the display means displays the category groups as a single stream of images visually separated into category groups by a group separation indicator.

* * * * *

UNITED STATES PATENT AND TRADEMARK OFFICE
CERTIFICATE OF CORRECTION

PATENT NO.    : 6,538,698 B1                                              Page 1 of 1
DATED         : March 25, 2003
INVENTOR(S)   : Eric C. Anderson It is certified that error appears in the above-identified patent and that said Letters Patent is hereby corrected as shown below:

<u>Column 8,</u>
Line 39, remove "select,ion" and replace with -- selection --.

Signed and Sealed this

Sixth Day of May, 2003

JAMES E. ROGAN
*Director of the United States Patent and Trademark Office*